Jan. 13, 1959
E. D. RATTIGAN
2,868,596
VALVE SEAL AND MECHANISM
Filed Feb. 4, 1955
3 Sheets-Sheet 1
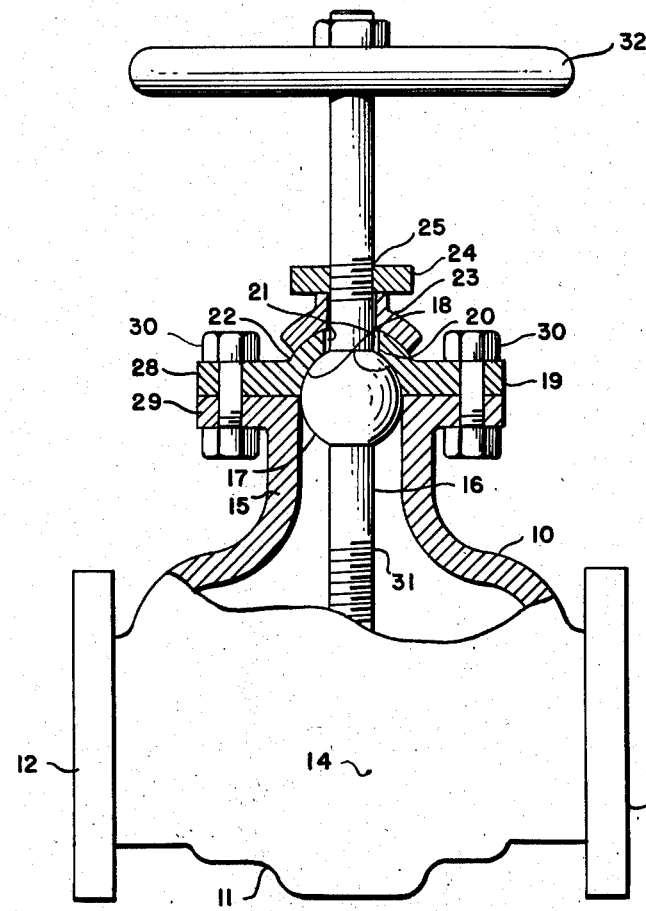
FIG. 1.
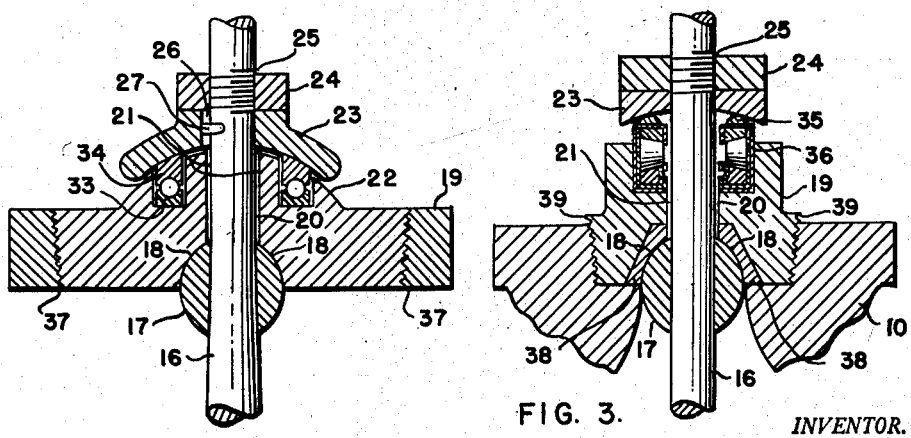
FIG. 2.
FIG. 3.
INVENTOR.
EDWIN D. RATTIGAN
BY
*Sidney W. Frick*
ATTORNEY Jan. 13, 1959     E. D. RATTIGAN     2,868,596
VALVE SEAL AND MECHANISM Filed Feb. 4, 1955     3 Sheets-Sheet 2

INVENTOR.
EDWIN D. RATTIGAN
BY
*Sidney W Frick*
ATTORNEY

Jan. 13, 1959 E. D. RATTIGAN 2,868,596
VALVE SEAL AND MECHANISM
Filed Feb. 4, 1955 3 Sheets-Sheet 3

INVENTOR.
EDWIN D. RATTIGAN
BY
*Sidney W Frick*
ATTORNEY

United States Patent Office 2,868,596
Patented Jan. 13, 1959

2,868,596

VALVE SEAL AND MECHANISM

Edwin D. Rattigan, Chalfont, Pa.; A. Frieda Rattigan, administratrix of said Edwin D. Rattigan, deceased Application February 4, 1955, Serial No. 486,150

15 Claims. (Cl. 308—187.1)

This application is a continuation-in-part of my copending application, now abandoned, Serial Number 365,946, filed July 3, 1953, for Seal, which application will now be permitted to lapse without prejudice, in view of its being superseded by this present application.

This invention relates to leakage-opposing seals, and particularly to seals for valves utilizing rotatable but non-rising operating members or shafts, although its uses are not confined thereto. Typical further uses may be in conjunction with such devices as impeller pumps, boat propellers, etc. One of its main objectives is to provide a seal which eliminates the need for conventional packing, without sacrificing its flexibility. The disadvantages of conventional packing, made of rubber, plastic, fiber, or other soft or yieldable material, are well known. At best, such packing requires frequent replacement, its resistance to extremes of temperature and pressure is of a low order, and it is incapable of performing its desired function in the handling of many types of materials. Due to its yieldable nature, however, it provides, when used, a much needed degree of flexibility, and efforts heretofore made to eliminate such packing while maintaining a tight seal have been of only limited success due to resulting elimination of this flexibility. The need for such flexibility is readily apparent when the necessity for even contact of the valves proper with their seats is borne in mind. Feasible manufacturing tolerances may be too great for successful valve closing without any flexibility in the mounting of the valve proper relative to its seat. Furthermore, in use, the operating member or other parts may become bent or displaced rather easily, requiring flexibility in mounting as off-setting compensation. Uneven wearing of parts may also result in uneven valve seating unless suitable compensation is provided.

A further objective of this invention is the provision of a seal for valves and other devices adaptable to a great variety of uses, including those involving high or low pressure or a vacuum, high or low temperature, and requiring the handling of steam and other gases, petroleum products and derivatives, solvents, and other liquids, whether corrosive or otherwise chemically active or inert, or radio-active, or whose physical characteristics are such as increase the severity of the handling problems, etc.

A feature of the invention is the way in which it may take advantage of the high pressure available in a particular application to improve the effectiveness of the seal, yet still be readily adaptable for low pressure or vacuum uses. The invention may also be adapted to take advantage of internal pressures lower than atmospheric or other external pressures to improve the effectiveness of the seal.

Another advantage of the invention is its utility in combination with different types of valves, including single and dual gate valves, globe valves, butterfly valves, plug valves, etc.

Still a further objective of the invention is the provision of a packless seal having reduced tendency to bind and render difficult the turning of the operating member, and containing means to avoid such binding.

Other advantages include ease of effective lubrication in applications requiring it, facility with which selected materials for mating surfaces of the seal may be incorporated where critical, and means for positive locking of the valve in any desired operating position, and for providing a seal having a tightness appropriate to and as required by various specific applications.

How the foregoing objectives, advantages and features are attained, as well as others which will be made apparent hereinafter, will appear more fully in the following description, referring to the accompanying drawings wherein:

Figure 1 is an elevation view of a valve embodying the present invention, shown partly in cross-section and partly in outline;

Figures 2 and 3 are detail elevational cross-sections showing various additional features of the invention, as more fully described hereinafter;

Figure 5:
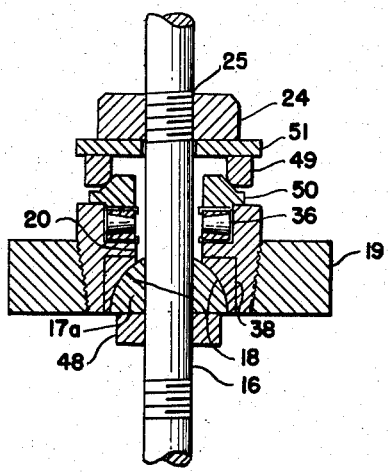
Figure 6:
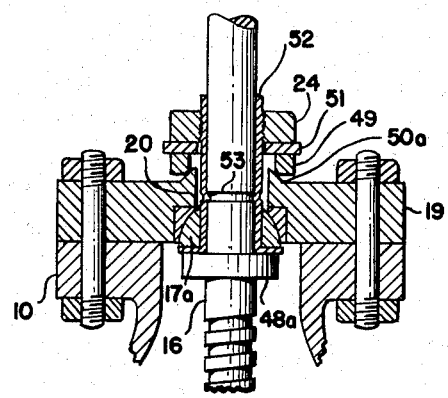
Figure 4:
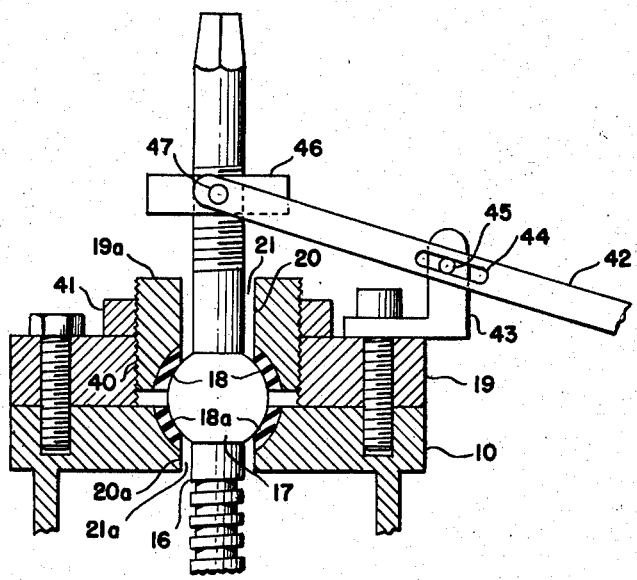
Figure 7:
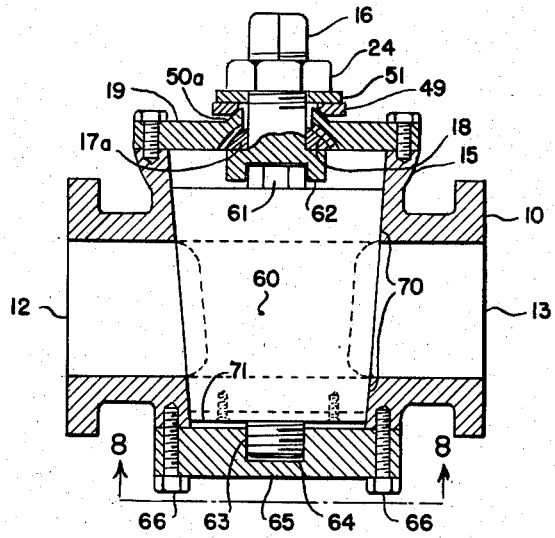
Figure 8:
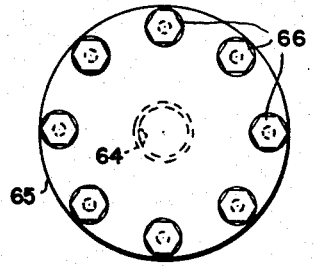
Figure 9:
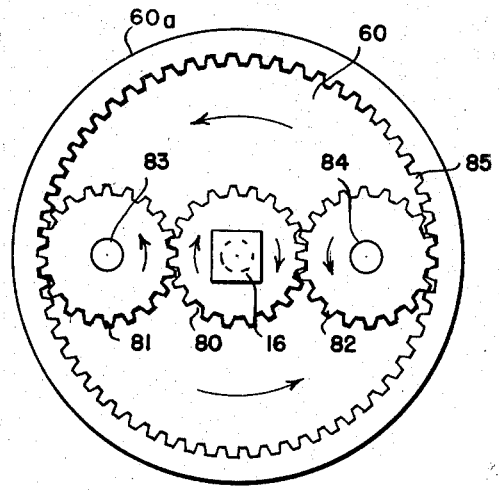

Figures 4, 5, and 6 are further elevational cross-sections showing additional adaptations of the invention;

Figure 7 is an elevational view, partly in cross-section and partly in outline, illustrating the use of the seal of this invention in combination with a novel form of plug valve;

Figure 8 is a plan view of one of the details of the plug valve shown in Figure 7, taken along line 8—8 of Figure 7, and Figure 9 is a plan view of a planetary gear system for facilitating the operation of large size valves such as shown in Figure 7 and which utilize the seal of this invention.

Referring now to the drawings in detail, the valve casing 10, illustratively, comprises a pipe T 11, having inlet and outlet ports 12 and 13, respectively, which may be threaded for ready placement in a flow line, a valve chamber 14, and an integral operating member portion 15 disposed generally normal or angularly of the flow line. Operating member or shaft 16 is assembled into the valve casing 10 as shown in Figure 1. Such shaft is provided with a concentric spherical ball 17 having a substantially larger diameter than the shaft, which ball may be an integral machined portion of the shaft, as in Figure 1, or a separate part in tapered assembly with the shaft, as shown in Figure 2, or screw or other assembly means may be used as desired. Ball 17, together with concave mating surfaces or seat 18 of bonnet 19, comprises the valve seal. Bonnet 19 is provided with hole 20 through which operating shaft 16 is assembled and which is of sufficiently greater diameter than the operating shaft to provide clearance space 21 of a desired size. Bonnet 19 contains convex or dome-shaped portion 22. Concave ring 23, concentrically assembled onto operating shaft 16, mates with convex portion 22 of bonnet 19 and is held thereagainst by adjustment nut 24 threaded onto operating shaft 16 at 25. The mating surfaces of ball 17 and bonnet 19, and the mating surfaces of bonnet 19 and ring 23, all are spherical in shape and have a common center of curvature which falls on the rotational axis of operating shaft 16, which is required for proper functioning. Ring 23 may be keyed to operating shaft 16 by means of keyway 26 and taper pin 27, as shown in Figure 2, so as to prevent relative rotational movement between ring 23 and operating shaft 16 and possible consequent turning of adjustment nut 24 relative to the operating shaft.

Bonnet 19 and casing 10 may be provided with mating flange portions 28 and 29, respectively, and assembled to each other by through-bolts 30 and nuts, or by screws or studs. A suitable gasket, not shown, may be placed therebetween, if desired. The lower extremity of operating shaft 16 may be externally threaded as at 31, or may be hollow and internally threaded, or may be hollowed in non-circular cross-section, or shaped externally into non-circular cross-section, for mating assembly with the valve proper, in desired manner, and so that rotational movement of operating shaft 16 without axial movement thereof will effect the opening and closing of the valve proper, either by movement of the valve proper, with or without an intermediate valve stem, relative to its seat, and axially of the operating shaft, or otherwise. A handle 32 may be provided to facilitate valve operation, or the external end of the operating shaft may be shaped for wrench operation, as desired.

The flexibility of the foregoing arrangement becomes readily apparent. In operation, clearance space 21 between operating shaft 16 and bonnet 19 permits limited oscillatory movement of the shaft about the common center of the spherical surfaces, and consequently of the valve proper relative to its seat, sufficient to readily and automatically compensate for any acceptable range of manufacturing tolerances, uneven wear, bending or displacement of the shaft or other parts, etc., while maintaining effective valve functioning. This flexibility simplifies manufacturing and maintenance problems and enables use of the valve in more rugged and exacting applications. At the same time the effectiveness of the sealing means can be maintained by positioning of adjustment nut 24 to provide any degree of tightness demanded by the particular application, which may vary with the nature of the material being handled and with the pressure and temperature conditions, etc.

High pressure applications of the seal aid its effectiveness through the outwardly directed force of the material under pressure against the internally exposed surfaces of ball 17. Yet the seal may be made equally effective for low pressure or vacuum applications by appropriate adjustment of nut 24, or by the adaptation of the invention illustrated in Figure 4. In this adaptation, the portion of bonnet 19 containing hole 20 and concave mating surfaces or seat 18 comprises sleeve follower 19a which is screw-assembled into the remaining portion of bonnet 19 by means of threads 40. Lock nut 41 serves to maintain the position of sleeve follower 19a against ball 17 with whatever degree of tightness may be desired in a particular application. The top of valve casing 10 is provided with centrally located hole 20a corresponding with hole 20 in sleeve follower 19a, to permit introduction of operating shaft 16 into the valve chamber and having a diameter corresponding to that of hole 20 to provide clearance space 21a similar to clearance space 21. Concave surfaces or seat 18a are provided in valve casing 10 to correspond with surfaces 18 of sleeve follower 19a and to supply a seat for the lower portion of ball 17. The operation of this adaptation is evident from the foregoing explanation. The effectiveness of the seal is increased in high pressure applications by the tendency of ball 17 to be forced against upper seat 18 in sleeve follower 19a, and in low pressure or vacuum applications by the tendency of ball 17 to be forced against lower seat 18a in valve casing 10. In either application the position of sleeve follower 19a may be adjusted and fixed by lock nut 41 for even greater sealing efficiency consistent with ease of operation. Clearance spaces 21 and 21a will permit the needed limited oscillatory movement of shaft 16 as before.

An added feature illustrated in Figure 4 but useful in any valve having a non-rising operating shaft is signalling device comprising lever arm 42, bracket 43 to which lever arm 42 is slidably and rotatably attached by means of slot 44 and pin 45, bracket 43 being in turn fixed to bonnet 19, and collar 46 in threaded assembly with operating shaft 16 and to which one end of lever arm 42 is rotatably attached by means of pin 47. In operation, as the valve is opened collar 46 will move axially along shaft 16 and lever arm 42 will accordingly move to show at a glance by its position the internal position of the valve.

In Figures 1, 2, and 3, the shape of the internally exposed surfaces of ball 17 is not critical, and such surfaces may be of any other appropriate shape dependent upon material used and consistent with strength requirements, suitable pressure distribution and economy and simplicity of manufacture. In Figure 1 particularly, however, it is necessary for the mating surfaces of the ball 17 and the bonnet 19 and of the bonnet 19 and the ring 23 to be spherical surfaces with a common center falling on the axis of operating shaft 16, as heretofore noted. In lesser degree this is also true in Figures 2 and 3. Of course in Figure 4 the center of ball 17, falling on the axis of shaft 16, and the centers of concave surfaces or seats 18 and 18a are arranged so as to coincide substantially in operation when sleeve follower 19a is properly adjusted.

The spherical shapes of the mating surfaces of the seal, as aforesaid, and the ability of the operating shaft to oscillate within limits, all as described above, counteract any binding tendency, and result in easier turning of the operating shaft. However, and again dependent upon the particular application, where seal tightness of a high degree may be required, ball bearings 33, mounted in raceway 34 between concave ring 23 and dome-shaped portion 22 of bonnet 19, as shown in Figure 2, or a half round ring 35 rotationally mounted in tapered roller bearing and raceway assembly 36, which is fixedly attached to the bonnet, and replacing dome-shaped portion 22, as shown in Figure 3, may be provided to facilitate rotational operation of the operating shaft without binding. Alternatively or additionally, adjustment nut 24 may be loosened during the turning of the operating shaft and then tightened to lock the valve in any desired operating position.

Such lubrication as may be required between mating surfaces of the seal may be facilitated by introduction into clearance space 21 and capillary attraction therefrom to and between the mating surfaces. Material the flow of which is being regulated by the valve and which has lubricating characteristics may automatically lubricate the seal as necessary. Self-lubrication may be provided in appropriate applications by, for instance, choosing laminated Bakelite for the bonnet material which may be impregnated with a lubricant or will absorb water lubrication in damp locations.

It may be readily appreciated how the foregoing device facilitates selection and use of different materials and different combinations of materials, including base and precious metals, glass, plastics, etc., for the different parts of the seal, as may be required in various critical applications. Figure 2 illustrates the manner in which ball 17 may be assembled to shaft 16 if a different material is desired, and also how the material of the mating surfaces portion of bonnet 19 can be different from and threaded into the remaining portion thereof with standard tapered pipe threads 37. Figure 3 further illustrates how the immediate mating surfaces portion 38 of bonnet 19 can be of different material than the surrounding portions thereof, as, for instance, poured Babbitt or other anti-friction metal. Figure 3 also illustrates how bonnet 19 may be reduced in size and screw assembled, by standard tapered pipe threads 39, into casing 10 which is appropriately conformed for such purpose. Separate assembly of the seal parts to a tubular member which may then be slid over the operating shaft or valve stem of a standard valve with minor changes is facilitated by the foregoing.

Figure 5 shows a modification of the form of Figure 3 wherein shaft 16 is provided with fixedly attached collar 48 and hemisphere 17a resting thereon, instead of ball 17, and wherein ring 23 and half round ring 35 are replaced by contour compensating ring 49, bevel thrust ring 50, and spanning washer 51. Contour compensating ring 49 has a substantially larger internal diameter than the diameter of shaft 16 and has a curved bevel on the lower edge of its internal circumference. Mating with the straight bevel on bevel thrust ring 50, ring 49 will move easily up and down the beveled portion of ring 50 as shaft 16 oscillates, automatically adjusting itself while maintaining intimate contact between the mating surfaces of the two rings. Spanning washer 51 has a slightly larger internal diameter than the diameter of shaft 16, and has an outer diameter larger than standard size adjustment nut 24 and contour compensating ring 49. Illustratively, when shaft 16 oscillates clockwise about the common centers of hemisphere 17a and concave surfaces or seat 18, ring 49 moves to the right under washer 51, with its right inner bevel travelling down the straight bevel on the right side of ring 50 while its left inner bevel edge travels up the straight bevel on the left side of ring 50. As ring 49 moves to the right its right outer edge moves nearer to right outer edge of washer 51. Shaft oscillation counterclockwise reverses the foregoing relative motions. This modification reduces the area of sliding contact and minimizes frictional forces thereby, and at the same time provides ready means for automatically maintaining intimate contact between mating surfaces of rings 49 and 50 as mating surfaces of hemisphere 17a and seat 18 wear, without lessening the effectiveness of the seal or the oscillating feature, necessitating no more than tightening of adjustment nut 24. Manufacture and assembly is also simplified since the number of spherical surfaces needing a common center is reduced to two. Hemisphere 17a need not necessarily fit shaft 16 tightly since the seal may be maintained by grinding the mating surfaces of the hemisphere and collar 48 to provide intimate contact therebetween.

Figure 6 shows how a conventional or standard valve having an operating stem with collar 48a integral therewith may be simply provided with the sealing means of this invention by slipping onto the shaft sleeve adapter 52 upon which hemisphere 17a has already been fixed. The position of sleeve adapter 52 on shaft 16 may be fixed by means of groove 53. Figure 6 also illustrates a modification of the arrangement of Figure 5 wherein roller bearing and raceway assembly 36 and bevel thrust ring 50 are removed and straight bevel surface 50a for mating with contour compensating ring 49 is integrated with bonnet 19 in concentric position about hole 20.

The great utility of the sealing means of this invention as detailed hereinabove when used in combination with a particular valve proper becomes quickly evident from a consideration of Figure 7. Illustratively, a plug type valve is shown and a novel form thereof which particularly lends itself to use in combination with this type of sealing means is particularized. Tapered plug 60 has affixed centrally of its upper surface conventional bolt head 61. Operating shaft 16 terminates internally of the valve chamber in socket wrench head 62 adapted to fit over bolt head 61. Sealing surfaces are those of sphere portion 17a and concave surfaces or seat 18, with straight bevel surface 50a, contour compensating ring 49, spanner washer 51 and adjustment nut 24, all serving the functions heretofore described. Plug 60 has affixed centrally of its lower surface threaded lift screw 63 which is screw-assembled into internally threaded recess 64 in plate 65 which in turn is affixed to the bottom of valve casing 10 by means of studs 66. Casing 10 contains internal valve seat 70 tapered to match the taper of plug 60. In closed position the tapered surfaces of plug 60 and seat 70 are in full and intimate contact with each other. Plug 60 has ellipsoidally shaped flow passage therethrough which lines up with inlet and outlet ports 12 and 13 providing a continuous flow passage therewith when the valve is in open position as depicted in Figure 7. In turning the plug the quarter-revolution between closed and open positions lift screw 63 turns in threaded recess 64 raising the plug slightly off its seat and breaking the contact of the respective tapered surfaces. This axial movement minimizes the frictional forces met in operation and consequently results in easier operation and substantial reduction in wear. At the same time the sealing means maintains an effective seal and through its oscillatory feature readily compensates for manufacturing and assembly inaccuracies and such wear as may eventuate. Location of lift screw 63 at the bottom of plug 60, and separate from the operating shaft, simplifies the forces acting upon it, which are axial only, pushing in opening and pulling in closing. The torque strain to which the operating shaft is subjected is absent from lift screw 63. If desired, lift screw 63 may be provided with supplementary plate 71, to facilitate ready replacement when worn. Ready adjustment of plug 60 with respect to its seat 70 may be had by providing bottom plate 65 with a plurality of studs 66 about its periphery as most clearly shown in Figure 8, which will permit rotation of plate 65 in fractional revolution steps on assembly for proper positioning of plug 60 prior to fastening plate 65 in position.

Figure 9 illustrates a means of facilitating operation of large size plug valves, which may be applied to the combination of Figure 7 if desired. Essentially this comprises a force-multiplying gear chain. Pinion gear 80 may be positioned centrally of but not attached to the upper surface of plug 60, bolt head 61 being fixedly attached thereto, or alternatively operating shaft 16 may be terminated in fixedly attached pinion gear 80 in place of socket wrench head 62, and the said pinion gear positions itself between and meshes with gear followers 81 and 82 floating about pins 83 and 84 respectively, fixed into the under surface of bonnet 19. Gear followers 81 and 82 in turn mesh with the internal teeth 85 of ring gear 60a affixed peripherally to the upper surface of plug 60. The leverage thus provided multiplies the small turning force applied to the operating shaft to the larger force required for turning the plug within the valve casing.

The many advantages of the present invention become increasingly evident from consideration of the foregoing description. Flexibility in manufacture and in operation, and adaptability to comply with the various requirements of a multitude of different applications are but two of these important advantages. While an embodiment of the invention and certain adaptations thereof have now been described and illustrated, the invention is not limited to the specific forms and arrangements so shown and described. Many modifications and variations, combinations, adaptations and uses thereof will occur, and it must be understood that all such modifications, etc., are equally within the contemplation and scope of the invention and the appended claims.

Having thus described my invention, I claim:

1. A valve having a fluid tight chamber enclosed, at least in part, by a casing, a bonnet fixedly attached thereto having an inwardly concave portion with a centrally located hole therethrough, and a rotatable operating shaft extending through said hole into said chamber and having a diameter appreciably smaller than the diameter of said hole so as to permit oscillation of said shaft within said hole, said shaft having an enlarged portion internally of said casing with the said enlarged portion having a convex surface mating with the said inwardly concave portion of said bonnet, said bonnet having associated with it an external outwardly disposed surface concentric with said hole, and said shaft having concentrically associated with it a surface for mating with said external surface associated with the bonnet, said latter two mating surfaces being so contoured and adapted as to facilitate rotation and oscillation of said operating shaft, and an adjustment nut in screwed assembly with said shaft holding all said mating parts in desired juxtaposition.

2. In a valve having an enclosed chamber, a seal comprising an operating member having thereon a convex spherical surface substantially greater in diameter than the member, a bonnet having an inwardly concave spherical surface mating therewith internally of the chamber and having a centrally located hole of appreciably greater diameter than the member, said member extending through said hole, said bonnet having an outwardly convex spherical surface externally of said chamber, a concave ring mating therewith and an adjustment nut holding the said mating parts together, all of said spherical surfaces having a common center on the axis of said operating member.

3. In a fluid control device, a casing, an operating shaft having an enlarged portion internally of the casing containing an outwardly convex surface of revolution, a bonnet having an inwardly concave surface of revolution mating therewith and having a centrally located hole with diameter appreciably greater than the diameter of the shaft, said shaft extending therethrough, said bonnet having an outwardly convex surface of revolution externally of the casing, a concave ring mating therewith concentric with and slidably assembled to said shaft, means to prevent rotation of said ring relative to said shaft, and an adjustment nut in screwed assembly with said shaft holding all said mating surfaces together.

4. In a fluid control device, a casing, an operating shaft having an enlarged portion internally of the casing containing an outwardly convex surface of revolution, a bonnet having an inwardly concave surface of revolution mating therewith and having a centrally located hole with diameter appreciably greater than the diameter of the shaft, said shaft extending therethrough, said bonnet having an outwardly convex surface of revolution externally of the casing, a concave ring mating therewith concentric with and slidably assembled to said shaft, a raceway mounted between the convex surface of the bonnet and the concave ring and ball bearings therebetween, means to prevent rotation of said concave ring relative to said shaft, and an adjustment nut in screwed assembly with said shaft holding all said mating surfaces together.

5. In a fluid handling device, a casing, an operating shaft having an enlarged portion internally of the casing containing an outwardly convex spherical surface, a bonnet having an inwardly concave spherical surface mating therewith and having a hole located centrally of said inwardly concave spherical surface, the diameter of said hole being appreciably greater than the diameter of the operating shaft, said shaft extending therethrough, a circular tapered roller bearing and raceway assembly fixedly attached to the bonnet externally thereof and a ring of half-round cross-section rotatably mounted therein, a concave ring concentric with and slidably assembled to said shaft in juxtaposition with said half-round ring, means to prevent rotation of said concave ring relative to said shaft, and an adjustment nut in screwed assembly with said shaft holding all said mating and juxtapositioned components together in such manner as to permit rotation and limited oscillatory motion of the shaft while preventing axial movement thereof.

6. In a fluid handling device, a casing, an operating shaft having an enlarged portion containing an outwardly convex spherical surface, a bonnet having a portion with an inwardly concave spherical surface mating therewith and having a hole located centrally of said inwardly concave spherical surface, the diameter of said hole being appreciably greater than the diameter of the operating shaft, said shaft extending therethrough, a circular tapered roller bearing and raceway assembly fixedly attached to the bonnet externally thereof and concentrically with said hole, a straight bevel thrust ring rotatably mounted in said bearing and raceway assembly, a contour compensating ring with internal diameter substantially greater than the diameter of the shaft and with a curved bevel about the lower edge of its internal circumference assembled about the shaft so that its curved bevel mates with the straight bevel of the thrust ring, a spanner washer assembled thereover about the shaft, and an adjustment nut thereover in threaded assembly with the shaft.

7. A valve assembly having a casing with inlet and outlet flow ports, a bonnet fixedly assembled to said casing and having an inwardly concave spherical surface and a hole therethrough located concentrically with said surface, an operating shaft with a diameter selectively less than the diameter of said hole extending therethrough and having an enlarged portion containing an outwardly convex spherical surface mating with said inwardly concave spherical surface of the bonnet, said bonnet having concentric with the hole therethrough an outwardly disposed straight bevel surface, a contour compensating ring having an internal diameter substantially greater than the shaft diameter and a curved bevel surface about its lower inner circumference assembled about the shaft externally of the casing so that its curved bevel surface mates with the straight bevel surface of the bonnet, a spanner washer thereover about said shaft and an adjustment nut threaded to the shaft thereover holding the mating surfaces together.

8. The valve assembly of claim 7 including a tapered rotatable plug positioned internally of the casing between the flow ports and a tapered seat mating therewith, said plug having a flow passage therethrough, a bolt head centrally affixed to the upper surface thereof and a lift screw affixed to and extending centrally below its bottom surface, a bottom plate fixedly assembled to the casing and having an internally threaded recess in screwed assembly with said lift screw, the operating shaft terminating internally of the casing in a socket wrench portion adapted to fit over the bolt head affixed to the plug.

9. The valve assembly of claim 8 having a pinion gear positioned centrally of the upper surface of the plug, two pins affixed to the under surface of the bonnet spaced oppositely of said pinion gear and two gear followers, one floating upon each of said pins, and a ring gear with internal teeth affixed peripherally to the upper surface of the plug, the assembly being so adapted that the pinion gear meshes with the gear followers which in turn mesh with the gear teeth of the ring gear.

10. In a valve having a fluid tight chamber with inlet and outlet flow ports, a tapered rotatable plug positioned internally of said chamber between said flow ports and a tapered seat mating therewith, said plug having a flow passage therethrough and a lift screw affixed to and extending centrally below its lower surface, and a bottom plate fixedly assembled to the casing and having an internally threaded recess in screwed assembly with said lift screw.

11. In the valve of claim 10 the bottom plate having a plurality of assembly holes spaced about its periphery, being so adapted as to enable relative adjustment between plug and seat upon assembly.

12. In a valve having an enclosed chamber, a seal comprising an operating member having thereon a convex spherical surface substantially greater in diameter than the member, a bonnet having an inwardly concave spherical surface mating therewith internally of the chamber and having a centrally located hole of appreciably greater diameter than the member, said member extending through said hole, said bonnet having associated with it an outwardly projecting surface externally of said chamber, a ring concentrically associated with said operating member providing a surface mating with said outwardly projecting surface associated with the bonnet, and means for adjustably holding all said mating parts together.

13. In a valve having an enclosed chamber, a hole extending into said chamber from externally thereof and an operating shaft having a diameter selectably smaller than said hole extending through said hole into the casing, a seal mechanism comprising two pairs of mating surfaces, one of each pair being associated with said operating shaft and the other of each pair being associated with the chamber, each of said pairs of mating surfaces providing a limit against axial movement of said operating shaft relative to said chamber in a direction opposite to that of the other, all of said mating surfaces being contoured so as to permit rotation of the shaft relative to the chamber and oscillatory movements of the surfaces associated with the operating shaft relative to their respective mating surfaces in paths having a common center on the axis of the operating shaft.

14. A fluid-tight device for the control of the flow of fluid internally thereof having a casing with inlet and outlet flow ports, means internally of said casing for controllably interrupting the passage of fluid through said ports, a bonnet attached to the casing and having a hole therethrough, a shaft extending through said hole into said casing and having means internally of the casing to engage and operate said means for interrupting the passage of fluid by rotation of said shaft from externally of the device, said bonnet having a spherically concave portion concentric with said hole therethrough, said shaft being selectably smaller in diameter than said hole and having an enlarged portion with a spherically convex surface mating with said concave portion of the bonnet and providing therewith a packless seal against leakage of fluid, said bonnet having assembled with it an external outwardly disposed surface concentric with said hole, and said shaft having concentrically assembled with it a ring providing a surface for mating with said external surface assembled with the bonnet, said latter two mating surfaces being so contoured and adapted as to permit rotation and oscillation of said operating shaft, and means for adjustably holding all said mating parts in desired juxtposition.

15. A valve having a fluid tight chamber enclosed, at least in part, by a casing having an outwardly concave spherical surface portion with a centrally located hole therethrough, a bonnet fixedly attached to said casing and having a centrally located sleeve follower portion in threaded assembly therewith, said sleeve follower portion having an inwardly concave spherical surface portion with a centrally located hole therethrough, a rotatable operating shaft extending through said holes in the casing and sleeve follower portion of the bonnet and having a diameter appreciably smaller than the diameters of said holes, said shaft having an enlarged portion comprising a spherically shaped ball with surfaces mating with the said outwardly and inwardly concave spherical surfaces of the casing and sleeve follower portion of the bonnet respectively, a lock nut in threaded assembly with said sleeve follower portion of the bonnet maintaining the adjustment thereof, and a signalling device including a collar in threaded assembly with the shaft externally of the casing, a pin affixed to said collar, a lever arm one end of which is rotatably assembled to said pin and which has at a distance from said end an elongated slot therethrough, a bracket affixed to the bonnet, a pin affixed to said bracket, and said lever arm slidably and rotatably assembled to said pin by means of said elongated slot.

References Cited in the file of this patent

UNITED STATES PATENTS

| | | |
|---|---|---|
| 111,621 | Dreyfus | Feb. 7, 1871 |
| 237,811 | Cadman | Feb. 15, 1881 |
| 1,025,884 | Schmitt | May 7, 1912 |
| 1,068,927 | Pribil | July 29, 1913 |
| 1,075,080 | Bacon | Oct. 7, 1913 |
| 1,685,381 | Smith | Sept. 25, 1928 |
| 2,123,356 | Glynn | July 12, 1938 |
| 2,187,477 | Oestreicher | Jan. 16, 1940 |
| 2,277,075 | Dahl | Mar. 24, 1942 |

FOREIGN PATENTS

| | | |
|---|---|---|
| 9,744 | Great Britain | 1904 |
| 48,596 | Denmark | 1932 |